United States Patent [19]

Marincek

[11] 4,044,696
[45] Aug. 30, 1977

[54] SEWAGE DISPOSAL PLANT WITH EVAPORATION/INCINERATION MEANS

[76] Inventor: Frank M. Marincek, 2019 Campus Road South Euclid, Cleveland, Ohio 44121

[21] Appl. No.: 693,485

[22] Filed: June 7, 1976

Related U.S. Application Data

[63] Continuation of Ser. No. 273,401, July 20, 1972, abandoned, which is a continuation of Ser. No. 23,601, March 20, 1970, abandoned.

[51] Int. Cl.² .............................................. A47K 11/02
[52] U.S. Cl. ............................... 110/9 E; 159/1 RW; 203/DIG. 5; 210/71

[58] Field of Search ................... 210/71, 175, 180, 12; 4/131, 216, 10, 115; 202/233, 234, 181; 203/12, 49, DIG. 5, 10, 11, 14; 159/1 RW; 201/2.5, 25; 110/8 E, 9 E

[56] References Cited

U.S. PATENT DOCUMENTS

| 2,432,887 | 12/1947 | Haviland | 210/71 |
| 3,642,583 | 2/1972 | Greenberg et al. | 203/11 |

Primary Examiner—Frank W. Lutter
Assistant Examiner—Frank Sever

[57] ABSTRACT

A sewage disposal plant for treating raw sewage. The plant has an enclosed tank with a heating element for evaporating or vaporizing the raw sewage, including solids and liquids. The sewage vapor is conveyed to another unit for condensing the vapor to an unpolluted liquid, suitable for disposal in a stream or other body of water.

12 Claims, 1 Drawing Figure

U.S. Patent Aug. 30, 1977 4,044,696
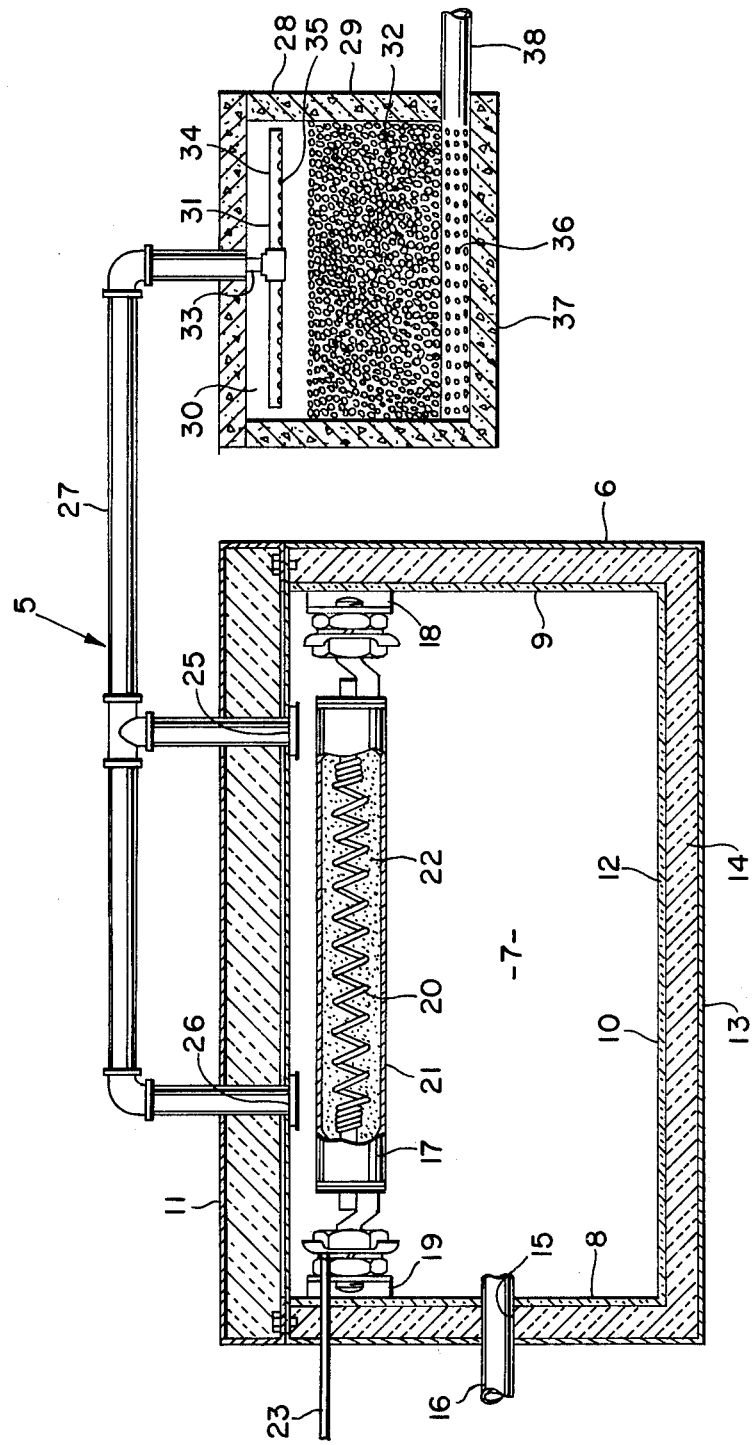

SEWAGE DISPOSAL PLANT WITH EVAPORATION/INCINERATION MEANS

BACKGROUND OF INVENTION

This application is a continuation application of Ser. No. 273,401, filed July 20, 1972, now abandoned, which, in turn, is a continuation application of Ser. No. 23,601, filed Mar. 30, 1970 now abandoned.

The invention is especially suitable in the treatment of human waste or excrement, i.e. feces and urine, carried from residences, business and industrial buildings through a network of sanitary sewers which may also include animal and vegetable wastes from garbage disposals and soaps and detergents from waste pipes connected to wash basins and laundry appliances.

Sewage is composed of about 99% water, but contains sufficient quantities of substances that are offensive and dangerous to the public health.

Physically, sewage contains matter in suspension and solution. Some of the suspended solids settle when the velocity of the transporting water is slowed down or reduced. Other solids remain in suspension for protracted periods of quiescence. When sewage is discharged without treatment, settling solids form silt and sludge deposits on the bottoms and sides of streams and interfere with the regimen of water courses, especially during periods of low flow. Floating solids, fats, and oily products may become stranded along the banks and form unsightly scums.

Chemically, sewage contains substances of animal, vegetable, and mineral origin. The animal and vegetable substances are collectively called organic matter and are in large part offensive in character or behavior. The organic matter is made up of complex chemical substances which are readily broken down by biological and chemical action into usually simpler compounds. Uncontrolled decomposition of organic matter, which constitutes about 50% of the sewage solids, is commonly accompanied by objectionable odors and other noxious conditions in streams or other bodies of water into which sewage is dumped.

Biologically, sewage contains vast numbers of living organisms, among which bacteria predominates. One gallon of sewage may harbor from 20 to 250 billion bacteria. Most of these organisms are harmless to man and are largely engaged in the beneficial activity of converting the complex organic constituents of sewage into simpler, more stable organic and mineral compounds. However, sewage may contain bacteria or other organisms coming from persons sick with typhoid fever, dysentary, or other so called water-borne diseases. Some disease producing organisms are present and constitute a danger to the public health.

The decomposition of sewage is generally the result of anaerobic decomposition or putrefaction and aerobic decomposition or oxidation. Putrefaction is the first stage, oxidation the second. The decomposition of sewage does not result in complete mineralization of all the organic matter present. A large proportion of this matter, particularly the sewage solids, is converted into sludge or humus-like organic compounds that are relatively stable. Putrefaction destroys the settled solids and oxidizes the colloidal and dissolved matter. Generally, sewage is treated by first removing the suspended portion of the sewage as an inoffensive or even marketable sludge, and secondly, oxidizing the soluble and collodial portions of the sewage.

In Municipal sewage systems, the raw sewage is first screened to collect and remove coarser particles, such as paper, bottles, and cans. The sewage is then conveyed to grit chambers where sand, mud, and gravel is removed. Afterward, the sewage is deposited in sedementation tanks where the organic solids are separated from the liquid and material suspended in the liquid. The fresh solids obtained, are in part organic and remain offensive, and it is necessary to render them stable before they can be disposed of. This is accomplished by permitting the solids to decompose in digestion tanks. Destruction or stabilization of the organic matter is brought about by the activities of hosts of living organisms, particularly the bacteria. The liquid and soluble and colloidal matter suspended in the liquid, is oxidized and rendered harmless by filtration or aeration.

In rural areas septic tanks are used to separate the solids from the liquid. The liquid is taken from the tank and trickled through a gravel filter, from which it is removed for disposal into storm sewers, or for seepage into the surrounding ground. The bacteria similarly attack the solids and reduce them to sludge.

It can be appreciated from the above brief description, that the purefying and processing of sewage is costly and time consuming. Moreover, the stabilized sludge, grit, and other material must be removed and somehow disposed of. The invention is directed to eliminating or substantially reducing many of the aforementioned problems by providing a sewage disposal plant which is relatively simple in operation and quickly and easily removes and destroys sewage, including solids and liquids, which are evaporatable at reasonably high temperatures.

Briefly stated, the invention is in a sewage treatment plant, having a tank with a confined chamber in which raw sewage is deposited. A heating element is disposed within the chamber for evaporating and vaporizing the raw sewage. Means are provided for removing the vapor and condensing it to a harmless liquid for easy removal.

DESCRIPTION OF THE INVENTION

The following description of the invention will be better understood by having reference to the annexed drawing which is a cross-sectional view of a sewage treatment plant 5, made in accordance with the invention. The sewage treatment plant 5 is especially well suited for the treatment and disposal of raw human waste or sewage, e.g. feces and urine. The sewage treatment plant 5 comprises a tank 6 with an enclosed or confined chamber 7 in which the raw sewage is treated.

The tank 6 is preferably rectangular including several pairs of parallel sidewalls 8 and 9 extending in upstanding relation from a bottom 10. A top or cover 11 is removably mounted on the sidewalls 8-9 of the tank 6 by any suitable means, e.g. bolts. The tank 6 has a heat resistant innerliner 12, which is preferably impervious to liquids and separated from a rigid outerliner 13 by any suitable thermal insulation 14, e.g. two inch filling of fiberglass or quartz containing insulation for high temperatures. A half-inch asbestos board and one-quarter inch steel plating has been found suitable for the innerliner 12 and outerliner 13, respectively. The tank 6 has a sewage inlet 15 disposed in the sidewall 8. A sewer or supply line 16 is secured to the sewage inlet 15 for carrying raw sewage from an outside source into the sewage treating chamber 7.

A heater or heating element 17 is disposed within the sewage treatment chamber 7 of the tank 6 for heating and evaporating or vaporizing raw sewage, including the solids and liquids. The heating element 17 is removably mounted for easy removal and replacement between a set of brackets 18 and 19 secured to the sidewalls 9 and 8. The heating element 17 may occasionally be immersed in the raw sewage and should therefore be designed to resist the detrimental effects of the raw sewage. For example, the heating element 17 may comprise an immersible resistance coil, or a resistance wire 20 disposed within a liquid impervious sheath or casing 21. A magnesium oxide powder 22 is, preferably, disposed within the casing 21 in surrounding relation around the resistance wire 20, which is heatable to incandescence by an electric current carried by a conduit 23 in electrical communication with the heating element 17 and an outside source of electricity. The heating element 17 is preferably disposed adjacent the top cover 11 of the tank 6.

A pair of fluid outlets 25 and 26 are disposed in spaced relation in the top cover 11 of the tank 6. A thermally insulated or heat resistant conduit such as asbestos pipe 27, is secured to the fluid outlets 25 and 26 in vapor communicating relation with the enclosed sewage treatment chamber 7 of the tank 6 for carrying the sewage vapors from the tank 6.

A condenser 28 is disposed adjacent the sewage treatment chamber 7 for receiving and condensing sewage vapors to liquid. The condenser 28 comprises a basin or receptacle 29 having an enclosed or confined compartment 30. A distributor 31 is provided within the compartment 30, for distributing sewage vapor from the conduit 27 downwardly against the bed of gravel 32 disposed in the compartment 30. The distributor 31 comprises a hub 33 with a number of radially disposed arms 34 with openings 35 through which the sewage vapor passes into contacting relation with the condensing material or gravel 32.

A perforated pipe 36 is disposed adjacent the bottom 37 of the basin 29 for receiving condensed vapor or liquid trickling down through the gravel 32. A discharge pipe 38 is secured in communicating relation with the perforated pipe 36 for removing the condensed vapor or liquid from the condenser 28.

A typical installation for a rural home having two baths and four occupants would be as follows: The sewage tank 6 is an asbestos lined, metal tank designed to handle from about 40-50 gallons of liquid, and measures overall approximately 20 inches wide by 24 inches high by 67 inches long. The condenser 28 is a conventionally designed concrete distribution box measuring about 36 inches square by 28 inches high. The sidewalls, bottom and top of the sewage tank 6 are about 3 inches thick, including 2 inches thick insulation. A piece of asbestos sewer pipe 16 is fastened between the sanitary sewer and the sewage inlet 15. The distributor 31 is preferably composed of one $-1\frac{1}{2}$ inch galvanized pipe and the condensing material 32 is silicone or gravel measuring in size from about one-quarter to about five-eighths inch. This particular unit can handle up to about 400 gallons of raw sewage per day, as compared to an estimated normal load of about 250 gallons per day.

The heating element 17, preferably, has a 1500° F. rating, i.e. it is capable of producing a minimum temperature of 1500° F. It has been found that a 1500° F. rated heating element 17 will evaporate or vaporize a standard toilet flushing of about 9 gallons in about three to about four minutes, whereas a smaller 1300° F. rated unit takes about ten minutes to evaporate the same amount of sewage. A 1000° F. rated heating element 17 is workable, but the time for evaporating the material is relatively long compared to the 1300°, 1500° and 3000° F. rated units, which have been used successfully. The 1500° F. rated heating element 17 is preferably operated on conventional 220 volt electrical current, which has proven more economical than the standard 110 volt current used for household lighting. Bigger units used in industrial and municipal applications, can be operated on higher voltages, depending on the rating of the heating element 17. The conduit 27 is composed of 4 inch asbestos pipe. This particular sewage disposal plant 5 is capable of evaporating or vaporizing raw sewage, including water carrying human waste and garbage from a disposal installed at the kitchen sink.

In operation, raw sewage flows from the various household plumbing fixtures into the enclosed tank 6. A conventionally designed, manually controlled timer switch can be used to periodically operate the heating element 17 to evaporate or vaporize the raw sewage. Moreover, a conventionally designed sensing mechanism, such as a float, can be placed within the sewage treatment chamber 7 for sensing the level of raw sewage and operating the timer controlling the flow of electricity to the heating element 17. The vaporized sewage is taken off through the fluid outlets 25 and 26 into the vapor line 27 and distributor 31 for dispersing on the gravel bed 32. The sewage vapor condenses and liquifies as it trickles downward through the gravel bed 32. The treated liquid flows from the gravel bed 32 into the perforated pipe 36 and discharge pipe 38 for removal from the sewage treatment plant 5.

Thus, there has been described a new and novel apparatus and method for treating sewage, including human feces and urine. This particular unit, depending on its size, can be used in homes, commercial buildings, and industrial plants. It can also be used in municipal sewage disposal plants, preferably, after the coarse screenings and grit, e.g. sand and gravel, has been separated from the raw sewage. There is no sludge removal as in more conventional septic systems, because the solids and liquids, being about 99% water, generally evaporate and form a vapor, which is then condensed by passage through a filter bed of gravel. The filtered liquid or water is relatively pure and free of impurities, and can be deposited in rivers or lakes without polluting the water. In come cases, e.g. vaporization of garbage solids, there may be a small powder or residue which, upon accumulation, can be readily removed from the sewage treatment tank. Such material is substantially odorless, or less offensive to the sense of smell, and does not quickly accumulate in such amounts as to create a problem of disposal.

Moreover, this particular unit is considerably cheaper to install and maintain than the more conventional septic tanks and filter beds used in rural areas. Also, the treated liquid passing from the condenser has been tested and analyzed, and found relatively free from pollutants and impurities normally found in liquid passing from the conventional septic tanks.

I claim:

1. A method for disposing of a batch of sewage, comprising:
   a. feeding a batch of sewage into a tank having a removable top and containing a heater means in the upper portion thereof free of the removable top;

b. heating the batch of sewage with the heater means to evaporate water of said batch and further to incinerate solid material of said batch remaining after evaporation of the water, so as to produce a powdery residue therefrom;

c. feeding water vapor from the tank to a condenser means comprising (I) an inlet through which water vapor enters the condenser means, (II) an outlet through which condensed water vapor exits from the condenser means, and (III) a quantity of particulate material sufficient to condense water vapor from said batch by absorbing heat therefrom;

d. withdrawing and disposing of water exiting from the outlet of the condenser means; and e. withdrawing and disposing of powdery residue in the tank.

2. The method of claim 1, wherein the heater means includes an electrically operated heater which is capable of being heated to a temperature of at least 1000° F.

3. A batch method of sewage disposal in a building such as a home or apartment, comprising:

a. feeding a batch of raw human sewage, including feces and urine, deposited in a plumbing fixture in the building, into the confined chamber of a tank located remote from the plumbing fixture, the tank having a removable top for sealing the chamber and a heater means disposed in the upper portion of the chamber free of the removable top;

b. heating the batch of sewage with the heater means to evaporate water of said batch and further to incinerate solid material of said batch remaining after evaporation of the water, so as to produce a powdery residue therefrom;

c. removing the water vapor from the chamber and feeding it to a condenser means comprising (I) an inlet through which water vapor enters the condenser means, (II) an outlet through which condensed water vapor exits from the condenser means, and (III) a quantity of particulate material sufficient to condense water vapor from said batch by absorbing heat therefrom;

d. withdrawing and disposing of water exiting from the outlet of the condenser means; and e. withdrawing and disposing of powdery residue in the tank.

4. The method of claim 3, wherein the batch of raw human is fed into the chamber of the tank through piping connected between the tank and plumbing fixture.

5. The method of claim 4, wherein the tank is located exteriorly of the building and below ground level, and the tank includes means for thermally insulating the chamber.

6. The method of claim 5, wherein the heater means includes an electrically operated heater which is capable of being heated to a temperature of at least 1000° F.

7. A system for disposing of a batch of sewage, comprising:

a. a closed tank with a removable top, the tank functioning to contain a batch of sewage to be disposed of;

b. inlet means cooperating with the tank and functioning to feed said batch of sewage into the tank;

c. heater means mounted in the tank in an upper portion thereof free of the removable top, the heater means functioning to evaporate water of said batch and further to incinerate solid material of said batch remaining after evaporation of the water, so as to produce a powdery residue therefrom;

d. vapor outlet means cooperating with the tank and functioning to remove water vapor produced by evaporation of the water;

e. means for condensing the water vapor, including (I) an inlet through which water vapor enters the condenser means, (II) an outlet through which condensed water vapor exits from the condenser means, and (III) a quantity of particulate material sufficient to condense water vapor from said batch by absorbing heat therefrom; and f. conduit means cooperating with the vapor outlet means and functioning to feed water vapor to the inlet of the condenser means.

8. The system of claim 7, wherein the heater means includes an electrically operated heater which is capable of being heated to a temperature of at least 1000° F.

9. A batch system of sewage disposal in a building such as a home or apartment, comprising:

a. a closed tank coupled by piping to at least one plumbing fixture in which a batch of raw human sewage, including feces and urine, is deposited, the tank located remote from the plumbing fixture and including a confined chamber for containing said batch of sewage and a removable top for sealing the chamber from the ambient atmosphere;

b. heater means mounted in the chamber in an upper portion thereof free of the removable top, the heater means functioning to evaporate water of the sewage and further to incinerate solid material of the sewage remaining after evaporation of the water, so as to produce a powdery residue therefrom;

c. inlet means cooperating with the tank and functioning to feed said batch of sewage from said piping into the chamber;

d. vapor outlet means cooperating with the tank and functioning to remove water vapor from the chamber;

e. means for condensing the water vapor, including (I) an inlet through which water vapor enters the condenser means, (II) an outlet through which condensed water vapor exits from the condenser means, and (III) a quantity of particulate material sufficient to condense water vapor from said batch by absorbing heat therefrom; and f. conduit means cooperating with the vapor outlet means and functioning to feed water vapor to the inlet of the condenser means.

10. The system of claim 9, wherein the tank is located exteriorly of the building and below ground level and includes means for thermally insulating the chamber.

11. The system of claim 9, which includes:

g. means for monitoring the level of sewage in the chamber; and h. means for operating the heater means when the sewage reaches a predetermined level in the chamber.

12. The system of claim 11, wherein the heater means includes an electrically operated heater which is capable of being heated to a temperature of at least 1000° F.

* * * * *